United States Patent
Kerhuel

(10) Patent No.: US 9,871,570 B1
(45) Date of Patent: Jan. 16, 2018

(54) BEAM DETERMINING UNIT AND BEAM-SEARCHING METHOD FOR A WIRELESS HETEROGENEOUS NETWORK

(71) Applicant: NXP USA, Inc., Austin, TX (US)

(72) Inventor: Samuel Kerhuel, Toulouse (FR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/464,506

(22) Filed: Mar. 21, 2017

(30) Foreign Application Priority Data

Dec. 13, 2016 (EP) ..................... 16306670

(51) Int. Cl.
*H04B 7/06* (2006.01)
*H04W 64/00* (2009.01)
*H04L 5/00* (2006.01)
*H04W 16/32* (2009.01)

(52) U.S. Cl.
CPC ......... *H04B 7/0617* (2013.01); *H04L 5/0051* (2013.01); *H04W 64/00* (2013.01); *H04M 2250/10* (2013.01); *H04W 16/32* (2013.01)

(58) Field of Classification Search
CPC .... H04B 7/0617; H04W 16/32; H04W 64/00; H04M 2250/10; H04L 5/0051
See application file for complete search history.

(56) References Cited

U.S. PATENT DOCUMENTS

2015/0045048 A1  2/2015  Xu et al.

FOREIGN PATENT DOCUMENTS

EP  2897304 A1  7/2015

OTHER PUBLICATIONS

Ghadikolaei, Hossein et al.: "Beam-Searching and Transmission Scheduling in Millimeter Wave Communications", IEEE, International Conference on Communications (ICC), 2015, Jun. 8-12, 2015, pp. 1292-1297.
Tampere University of Technology and University of Oulu: "5G Networks and Device Positioning", Jan. 2015-Dec. 2016, webpage: https://www.tekes.fi/globalassets/global/ohjelmat-ja-palvelut/ohjelmat/5thgear/reboot-the-finish-society-111115/07_mikko_valkama_5gndp.pdf, pp. 1-10.

*Primary Examiner* — Raymond Dean

(57) ABSTRACT

Embodiments include a beam determining unit intended to be connected to a wireless heterogeneous network and a beam-searching method for a wireless heterogeneous network. In the context of a millimeter wave heterogeneous network, it is proposed to do away with the conventional exhaustive beam-searching procedure which is both time and power consuming. Instead, it is proposed a two-step procedure where a line of sight path is determined between a user equipment and a small cell of the millimeter wave heterogeneous network based on positioning information of the user equipment and the small cell. Then, it is determined an optimal antenna beam pair comprising antenna beams at the user equipment and the small cell based on the determined line of sight path and the antenna beam directions available at the user equipment and the small cell level.

15 Claims, 3 Drawing Sheets

BEAM DETERMINING UNIT AND BEAM-SEARCHING METHOD FOR A WIRELESS HETEROGENEOUS NETWORK

FIELD OF THE INVENTION

This invention relates to a beam determining unit and a beam-searching method for a wireless heterogeneous network.

BACKGROUND OF THE INVENTION

Mobile data traffic has grown dramatically over the past several years and is continuing to grow rapidly due to the explosive increase of data-hungry services, as well as always connected smart mobile devices. In order to meet the capacity challenges, heterogeneous networks consisting of macro cells and small cells are considered as a promising solution. With different carrier frequencies deployed at macro cell and small cell layers, dual connectivity can be provided so as to allow a user equipment to simultaneously receive data from both a macro cell base station and a small cell base station.

Directional transmission based on antenna array beamforming in the millimeter wave band have been considered as an ideal candidate for the short range communications to be delivered by the small cells of heterogeneous networks. However, a main issue in millimeter wave communications is known as 'deafness' which occurs when the main beams of a transmitter and the intended receiver are not aligned and which deteriorate the communication performance.

To address this issue, a conventional beam-searching procedure is used prior to the establishment of the millimeter wave communication link. However, conventional beam-searching procedure requires performing an exhaustive search over all possible combinations of transmission and reception directions through a sequence of pilot transmissions.

Unsurprisingly, conventional beam-searching procedure requires a lot of time and power in order to find the best beam sets since the search time depends on the number of directions that have to be searched. Hence, an efficient beam-searching procedure is needed.

SUMMARY OF THE INVENTION

Further details, aspects and embodiments of the proposed solution will be described, by way of example only, with reference to the drawings. In the drawings, like or similar reference numbers are used to identify like or functionally similar elements. Elements in the figures are illustrated for simplicity and clarity and have not necessarily been drawn to scale.

BRIEF DESCRIPTION OF THE DRAWINGS

Further details, aspects and embodiments of the proposed solution will be described, by way of example only, with reference to the drawings. In the drawings, like or similar reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Embodiments of the inventive subject matter provide a beam determining unit intended to be connected to a wireless heterogeneous network and a beam-searching method for a wireless heterogeneous network, as described in the accompanying claims. Specific embodiments of the inventive subject matter are set forth in the dependent claims. These and other aspects of the inventive subject matter will be apparent from and elucidated with reference to the embodiments described hereinafter.

In the context of a millimeter wave heterogeneous network, it is proposed to do away with the conventional exhaustive beam-searching procedure which is both time and power consuming. Instead, it is proposed a two-step procedure where a line of sight path is determined between a user equipment and a small cell of the millimeter wave heterogeneous network based on positioning information of the user equipment and the small cell. Then, it is determined an optimal antenna beam pair comprising antenna beams at the user equipment and the small cell based on the determined line of sight path and the antenna beam directions available at the user equipment and the small cell level.

In traditional heterogeneous network, a user equipment is only connected to a single cellular link, either to a macro cell or to a small cell, which results in a compromise between coverage and capacity. Indeed, with traditional heterogeneous network, when a user equipment travels through different small cells, the handover happens at every edge of the small cells.

In contrast, heterogeneous networks with dual connectivity feature allow a user equipment to get rid of the coverage/capacity compromise through the paradigm of separation of control plane and user data plane paths, where a user equipment is both connected to a macro cell base station and to a small cell base station. With such architecture which is also known as "microcell-assisted small cell networks", the control plane signaling can be transmitted on the macro cell base station, thereby providing a continuous reliable cell coverage layer to user equipments at lower frequency band. Further, the user data plane traffic can be transmitted on the small cells using a higher frequency band, thereby offering high capacity and throughput.

Figure 1:
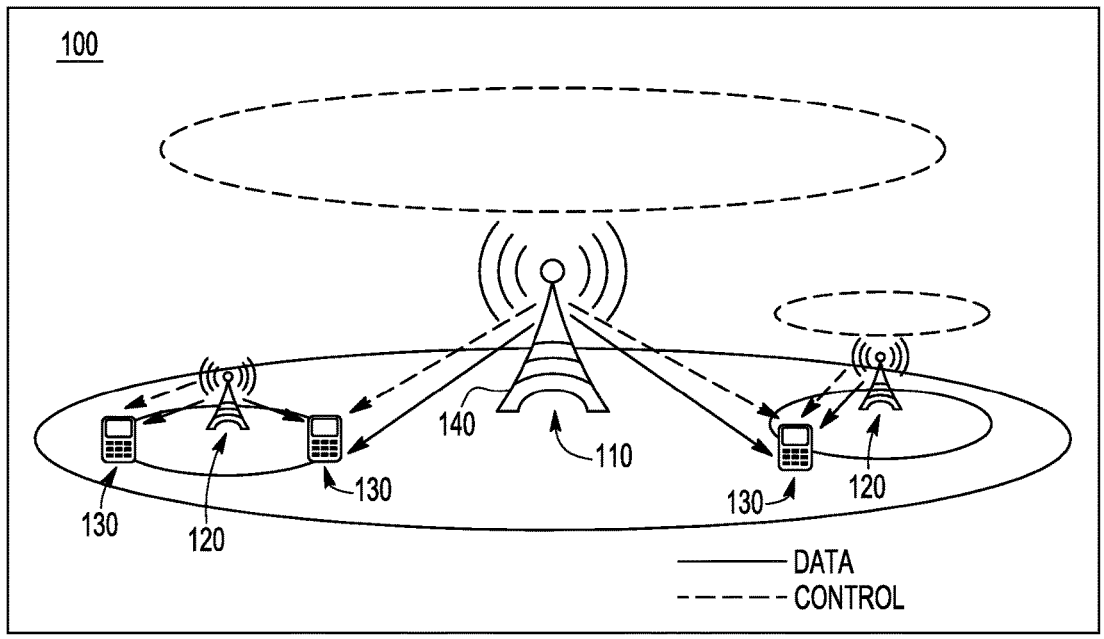
FIG. 1 is a simplified diagram of a heterogeneous network with dual connectivity feature.

FIG. 1 shows a heterogeneous network 100 with dual connectivity feature. As shown in FIG. 1, heterogeneous network 100 comprises one macro cell base station 110, two small cells base stations 120 and three user equipments 130, in accordance to an embodiment of the innovative subject-matter.

In FIG. 1, macro cell base station 110 is a conventional base station which is configured to operate in legacy frequency bands (e.g. 800 MHz, 900 MHz, 1800 MHz, 2 GHz) according to a legacy standard such as 3GPP Universal Mobile Telecommunications System (UMTS) or Long Term Evolution (LTE). Such arrangement permits backwards compatibility for legacy user equipments which can only operate on legacy standards.

Further in FIG. 1, small cells 120 are operably coupled to macro cell 110. However, in a particular embodiment each small cell 120 may be operably coupled to more than one macro cell 110. The connection between macro cell 110 and small cells 120 is performed through a conventional backhaul link such as an optical fiber backhaul link or a microwave backhaul link. In addition, each small cell 120 comprises a millimeter wave beamforming antenna. For instance, the millimeter wave beamforming antenna may be an active antenna system (AAS) configured to operate within millimeter wave frequency bands such the electromagnetic spectrum ranging from 6 GHz to 300 GHz which corresponds to wavelengths from 50 mm to 1 mm. It is hereby reminded that AAS technology integrate radio frequency components (i.e. power amplifiers and transceivers) with antenna elements so arranged as to electronically control the phase and amplitude of the signals from each antenna elements. As a result, beamforming can be performed thanks to the flexible and dynamic control over the radiated antenna pattern both vertically and horizontally.

Still in FIG. 1, macro cell 110 and small cells 120 are arranged in a master/slave relationship where macro cell 110 is the master. Also, macro cell 110 is configured to have its coverage overlaying the coverage of small cells 120 and to provide control plane signaling (shown in dot line in FIG. 1) and user data plane traffic (shown in plain line in FIG. 1) to user equipments 130. In contrast, each small cell 120 is configured to provide only user data plane traffic (shown in plain line in FIG. 1) to the user equipments 130.

In the example of FIG. 1, each user equipment 130 comprises a millimeter wave beamforming antenna similar to that of small cells 120. Such arrangement is readily achievable since the dimensions and necessary spacing of millimeter wave antennas are in the order of millimeters, such that multiple antennas can be integrated into portable devices such as user equipments 130.

Therefore, based on the foregoing, millimeter wave beamforming communication may be established between a user equipment 130 and at least one small cell 120. However, in order to obtain the optimal transmission/reception beam sets, conventional millimeter wave beamforming communication systems propose an exhaustive beam-searching.

Figure 2:
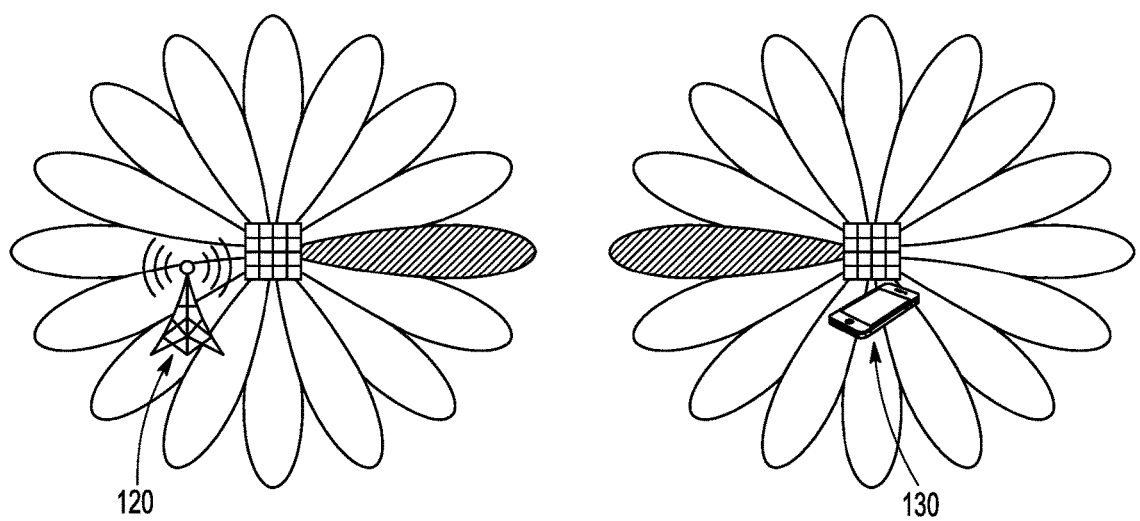
FIG. 2 is a simplified diagram showing part of FIG. 1 where conventional exhaustive beam-searching technique is used.

FIG. 2 shows part of heterogeneous network 100 where conventional exhaustive beam-searching technique is used. The following description will consider only the horizontal dimension (azimuth) for the sake of making the point. The complete system also includes the vertical dimension (elevation) which follows exact same pattern. By applying the exhaustive beam-searching technique in order to establish communication between small cell 120 and user equipment 130 of FIG. 2, small cell 120 would send a training sequence with one of its beam patterns (i.e. beam direction), while user equipment 130 would attempt to listen to it with different beam patterns at its side. The above process would then be repeated until all the beam patterns have been tried by small cell 120. Finally, the optimal transmission/reception beam pattern (i.e. the optimal antenna beam pair) could be found according to different parameters such as the magnitude of the path and the level of interference over the path. For example, this could be done by detecting the highest signal power or the best signal to interference ratio (SINR) received at user equipment 130.

One would note that the total number of transmission attempts in conventional exhaustive beam-searching technique is Bt×Br for each millimeter wave link if Bt and Br denote the number of beam patterns at the level of small cell 120 and user equipment 130, respectively. Hence, as a result, exhaustive beam-searching technique requires a lot of time and power in order to find the best beam sets since the search time depends on the number of directions that have to be searched.

Therefore, it is proposed a new beam-searching technique which does not require searching over all possible combinations of transmission and reception directions. Back to FIG. 1, in operation, heterogeneous network 100 further comprises a beam determining unit 140 in response to the connection of a user equipment 130 to macro cell 110 and before the user equipment 130 being simultaneously connected to a small cell 120.

Figure 3A:
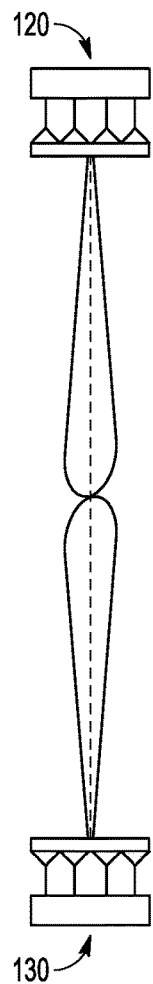
FIGS. 3A and 3B are simplified diagrams showing part of FIG. 1 according to embodiments of the innovative subject-matter.

Referring to FIG. 1, beam determining unit 140 is configured to determine an optimal antenna beam pair indicative of a substantially perfect alignment between antenna beams available at user equipment 130 and small cell 120. FIG. 3A shows part of heterogeneous network 100 where it is exemplified the notion of perfect alignment. Hence, by perfect alignment, as shown in FIG. 3A, it is meant a boresight alignment between one of the antenna beams available at the level of user equipment 130 and one of the antenna beams available at the level of small cell 120. According to embodiments of the innovative subject-matter, beam determining unit 140 in macro cell 110 performs the determining based on positioning information of user equipment 130 and small cell 120, and antenna beam directions at the level of equipment 130 and small cell 120.

In an embodiment, beam determining unit 140 comprises a receiving unit operably coupled to macro cell 110 and configured to receive the positioning information and the antenna beam directions.

In an example of the embodiment, the positioning information comprises geodetic coordinates comprising latitude information, longitude information and altitude information.

In a first example, the positioning information is obtained based on a global satellite positioning (GPS) measurement. In that case, user equipment 130 may comprise a GPS sensor configured to output a GPS measurement. Further, as user equipment 130 is connected to macro cell 110, the GPS measurement may be transmitted to the receiving unit of beam determining unit 140 via the user data plane traffic path. Regarding small cell 120, the GPS measurement may be predetermined, for instance, it may have been determined during the commissioning of heterogeneous network 100. The GPS measurement associated with small cell 120 may be stored at the base station of small cell 120 and transmitted to the receiving unit of beam determining unit 140 via the backhaul link coupling macro cell 110 and small cell 120. In another case, the GPS measurement associated with small cell 120 may be stored at the base station of macro cell 110.

In a second example, the positioning information is obtained based on a positioning reference signal of macro cell 110. In that case, macro cell 110 may transmit a positioning reference signal to user equipment 130. Then, upon reception of the positioning reference signal, user equipment 130 would determine a time of arrival (TOA) or time difference of arrival (TDOA) information associated with the positioning reference signal that would be communicated to macro cell 110. Finally, macro cell 110 could compute user equipment's location based on the received TOA or TDOA. As an example, such positioning reference signal may be found in legacy standards like LTE.

In another example of the embodiment, the antenna beam directions comprise a pair of azimuth beam direction and elevation beam direction associated with each beam of a millimeter wave beamforming antenna, where elevation direction is normal to the azimuth direction.

Further, in the embodiment, beam determining unit 140 also comprises a processing unit, such as a processor, configured to determine a line of sight path between small cell 120 and user equipment 130 based on the aforementioned positioning information of small cell 120 and user equipment 130, and to select the optimal antenna beam pair based on the determined line of sight path and the aforementioned antenna beam directions.

Figure 3B:
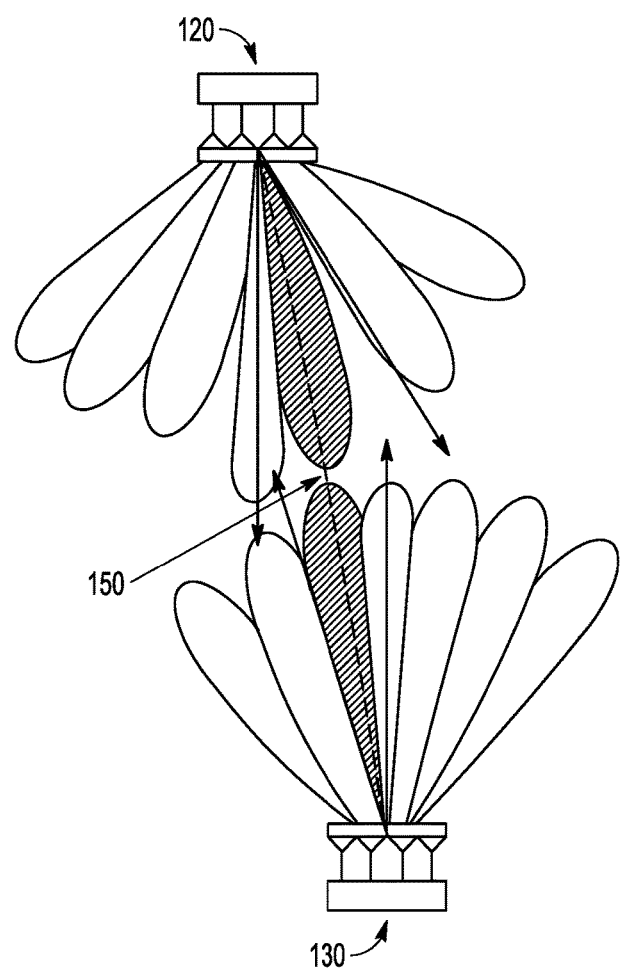

FIG. 3B shows part of heterogeneous network 100 where it is exemplified a line of sight path 150 (shown in dot line in FIG. 3B) between small cell 120 and user equipment 130, in accordance with the innovative subject-matter. In an example, given the positioning information of small cell 120 and user equipment 130, and by using conventional trigonometry, it can be determined line of sight path 150. In addition, still with conventional trigonometry, it can be determined a pair of azimuth direction and elevation direction associated with each end points of line of sight path 150, that is to say at the level of small cell 120 and at the level of user equipment 130.

In an example, the processing unit of beam determining unit 140 selects the optimal antenna beam pair based on a comparison criterion between the one or more pairs of azimuth beam direction and elevation beam direction associated with the antenna beam directions and two pairs of azimuth direction and elevation direction associated with the end points of line of sight path 150.

In a first embodiment, the comparison criterion comprises the closest pair of azimuth direction and elevation direction. In that embodiment, it results that the optimal antenna beam pair comprises the beam at the level of small cell 120 which boresight is the closest to line of sight path 150 and also the beam at the level of user equipment 130 which boresight is the closest to line of sight path 150. In the example of FIG. 3B, the selected beams are represented with hatched lines.

In a second embodiment, the comparison criterion comprises the pairs of azimuth direction and elevation direction comprised within a predetermined angle range around end points of line of sight 140. The predetermined angle range may be the same at both small cell 120 and user equipment 130. However, the predetermined angle range may be specific at each of small cell 120 and user equipment 130, or may be defined at the level of only one of small cell 120 and user equipment 130. In that embodiment, it results that more than one optimal antenna beam pair may be selected. In the example of FIG. 3B, the selected beams are represented within the bold arrow lines. In an example, the predetermined angle range may exhibit values such as 5°, 10°, 15° or 20°.

In a particular embodiment, beam determining unit 140 is comprised in a base station of macro cell 110. In that particular embodiment, macro cell 110 further comprises a transmitting unit (not shown) such as a transmitter which is configured to transmit the optimal antenna beam pair to small cell 120 and user equipment 130. In that case, small cell 120 would receive the characteristics of the best beam at the level of user equipment 130 and also that of the best beam of small cell 120 associated with that specific user equipment 130 in the specific location where it is standing. In contrast, user equipment 130 would receive the characteristics of the best beam at the level of small cell 120 and also that of the best beam of user equipment 130 associated with that specific small cell 120 in the specific location where it is standing. All the received information may be stored in a database of small cell 120 and/or user equipment for future use. In fact, it can be contemplated to first consider the content of such databases for establishing communication between small cell 120 and user equipment 130, before starting the beam-searching procedure as described above. Indeed, it could be time savvy to first try to establish communication based on an optimal antenna beam pair which has been previously determined in similar location configuration.

In a particular example of the particular embodiment, macro cell 110 may only transmit the beam information that is needed by small cell 120 and user equipment 130 to establish communication. In that case, small cell 120 would only receive information regarding the beam to be used at the level of small cell 120 and user equipment 130 would only receive information regarding the beam to be used at the level of user equipment 130.

In another particular embodiment, beam determining unit 140 is comprised in a base station of small cell 120 and in user equipment 130. In that case, small cell 120 receives positioning information of user equipment 130 and antenna beams directions at user equipment 130. In contrast, user equipment 130 receives positioning information of small cell 120 and antenna beams directions at small cell 120. Then, the optimal beam pair is determined at the level of small cell 120 and user equipment 130, as already explained above.

Figure 4:
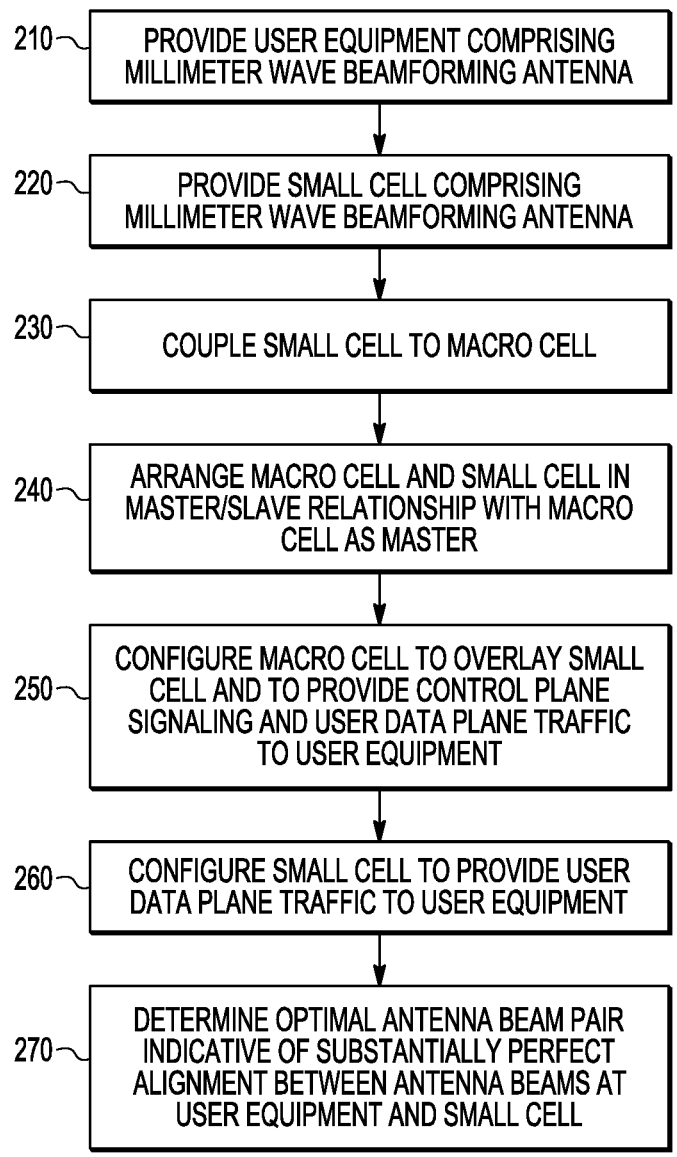
FIG. 4 is a flow chart of a method of upgrading a macro cell wireless network into a wireless heterogeneous network according to an embodiment of the innovative subject-matter.

Further, as shown in FIG. 4, embodiments of the proposed solution may also be implemented as a beam-searching method for a wireless heterogeneous network.

Such method may include:
at 210, providing at least one user equipment comprising a millimeter wave beamforming antenna,
at 220, providing at least one small cell comprising a millimeter wave beamforming antenna,
at 230, operably coupling the small cell to the macro cell,
at 240, arranging the macro cell and the small cell in a master/slave relationship where the macro cell is the master,
at 250, configuring the macro cell to overlay the small cell and to provide control plane signaling and user data plane traffic to the user equipment,
at 260, configuring the small cell to provide user data plane traffic to the user equipment,
wherein, in response to the connection of the user equipment to the macro cell and before the user equipment being simultaneously connected to the small cell, the method further comprising at 270, determining an optimal antenna beam pair indicative of a substantially perfect alignment between antenna beams at the user equipment and the small cell, the determining being based on positioning information of the user equipment and the small cell, and antenna beam directions at the user equipment and the small cell.

A further embodiment of the proposed solution may also be implemented as a beam-searching method for a wireless heterogeneous network having at least one user equipment comprising a millimeter wave beamforming antenna, at least one macro cell operably coupled to at least one small cell, the macro cell and the small cell being arranged in a master/slave relationship where the macro cell is the master, the macro cell configured to overlay the small cell and to provide control plane signaling and user data plane traffic to the user equipment, the small cell comprising a millimeter wave beamforming antenna and configured to provide user data plane traffic to the user equipment. Such method may include the above-mentioned step 270, in response to the connection of the user equipment to the macro cell and before the user equipment being simultaneously connected to the small cell.

In embodiments of the methods, the method further comprises:
  receiving the positioning information and the antenna beam directions,
  determining a line of sight path between the user equipment and the small cell based on the positioning information of the user equipment and the small cell, and
  selecting the optimal antenna beam pair based on the determined line of sight path and the antenna beam directions.

In first embodiments of the previous embodiment, the method further comprises:
  determining optimal antenna beam at the level of the macro cell, and
  transmitting the optimal antenna beam pair to the user equipment and the small cell.

In second embodiments of the previous embodiment, the method further comprises determining optimal antenna beam at the level of the user equipment and the small cell.

In other embodiments of the methods, the antenna beam directions comprise a pair of azimuth beam direction and elevation beam direction associated with each beam of the millimeter wave beamforming antenna where elevation direction is normal to the azimuth direction, and the method further comprising selecting the optimal antenna beam pair based on a comparison criterion between the one or more pairs of azimuth beam direction and elevation beam direction and two pairs of azimuth direction and elevation direction associated with the end points of the determined line of sight path.

In first embodiments of the previous embodiment, the comparison criterion comprises the closest pair of azimuth direction and elevation direction.

In second embodiments of the previous embodiment, the comparison criterion comprises the pairs of azimuth direction and elevation direction comprised within a predetermined angle range around end points of the determined line of sight path.

In one embodiment of the methods, the positioning information comprises geodetic coordinates comprising latitude information, longitude information and altitude information.

In alternative embodiments of the methods, the method further comprises obtaining the positioning information based on a GPS measurement.

In another alternative embodiment of the methods, the method further comprises obtaining the positioning information based on a positioning reference signal of the macro cell.

In the foregoing specification, the proposed solution has been described with reference to specific examples of embodiments of the proposed solution. It will, however, be evident that various modifications and changes may be made therein without departing from the broader scope of the proposed solution as set forth in the appended claims.

Embodiments of a wireless heterogeneous network also have been described herein. The heterogeneous network comprises:
  at least one user equipment comprising a millimeter wave beamforming antenna,
  at least one macro cell operably coupled to at least one small cell, the macro cell and the small cell being arranged in a master/slave relationship where the macro cell is the master,
  the macro cell configured to overlay the small cell and to provide control plane signaling and user data plane traffic to the user equipment,
  the small cell comprising a millimeter wave beamforming antenna and configured to provide user data plane traffic to the user equipment.

Further, in response to the connection of the user equipment to the macro cell and before the user equipment being simultaneously connected to the small cell, the heterogeneous network further comprising a beam determining unit configured to determine an optimal antenna beam pair indicative of a substantially perfect alignment between antenna beams at the user equipment and the small cell, the determining being based on positioning information of the user equipment and the small cell, and antenna beam directions at the user equipment and the small cell.

Embodiments of methods of upgrading a macro cell wireless network into a wireless heterogeneous network, where the macro cell network includes at least one macro cell, have been described herein. The method comprises:
  providing at least one user equipment comprising a millimeter wave beamforming antenna,
  providing at least one small cell comprising a millimeter wave beamforming antenna,
  operably coupling the small cell to the macro cell,
  arranging the macro cell and the small cell in a master/slave relationship where the macro cell is the master,
  at configuring the macro cell to overlay the small cell and to provide control plane signaling and user data plane traffic to the user equipment,
  at configuring the small cell to provide user data plane traffic to the user equipment,
  wherein, in response to the connection of the user equipment to the macro cell and before the user equipment being simultaneously connected to the small cell, the method further comprising determining an optimal antenna beam pair indicative of a substantially perfect alignment between antenna beams at the user equipment and the small cell, the determining being based on positioning information of the user equipment and the small cell, and antenna beam directions at the user equipment and the small cell.

Embodiments may include the features recited in the following numbered clauses:

1. A beam determining unit intended to be connected to a wireless heterogeneous network, the beam determining unit comprising: a receiving unit configured to receive positioning information of a user equipment and a small cell information and antenna beam directions at the user equipment and the small cell, and a processing unit configured to, in response to a connection of the user equipment to a macro cell and before the user equipment being simultaneously connected to the small cell, determine a line of sight path between the user equipment and the small cell based on the positioning information of the user equipment and the small cell, and select an optimal antenna beam pair based on the determined line of sight path and the antenna beam directions wherein the optimal antenna beam pair is indicative of a substantially perfect alignment between antenna beams at the user equipment and the small cell; and wherein the wireless heterogeneous network comprises, at least one user equipment comprising a millimeter wave beamforming antenna, at least one macro cell operably coupled to at least one small cell, the macro cell and the small cell being arranged in a master/slave relationship where the macro cell is the master, the macro cell is configured to overlay the small cell and to provide control plane signaling and user data plane traffic to the user equipment, the small cell comprises a millimeter wave beamforming antenna and is configured to provide user data plane traffic to the user equipment.

2. The beam determining unit of clause 1 being comprised in a base station of the macro cell, the macro cell further comprising a transmitting unit configured to transmit the optimal antenna beam pair to the user equipment and the small cell.

3. The beam determining unit of clause 1 being comprised in the user equipment and in a base station of the small cell.

4. The beam determining unit of clause 1 wherein the antenna beam directions comprise a pair of azimuth beam direction and elevation beam direction associated with each beam of the millimeter wave beamforming antenna where elevation direction is normal to the azimuth direction, and the processing unit is further configured to select the optimal antenna beam pair based on a comparison criterion between the one or more pairs of azimuth beam direction and elevation beam direction and two pairs of azimuth direction and elevation direction associated with the end points of the determined line of sight path.

5 The beam determining unit of clause 4 wherein the comparison criterion comprises the closest pair of azimuth direction and elevation direction.

6. The beam determining unit of clause 4 wherein the comparison criterion comprises the pairs of azimuth direction and elevation direction comprised within a predetermined angle range around end points of the determined line of sight path.

7. The beam determining unit of clause 1 wherein the positioning information comprises geodetic coordinates comprising latitude information, longitude information and altitude information.

8. The beam determining unit of clause 7 wherein the positioning information is obtained based on a GPS measurement.

9. The beam determining unit of clause 7 wherein the positioning information is obtained based on a positioning reference signal of the macro cell.

10. A beam-searching method for a wireless heterogeneous network comprising at least one user equipment and at least one macro cell coupled to at least one small cell, the beam searching method comprising: receiving positioning information of a user equipment and a small cell information and antenna beam directions at the user equipment and the small cell, and, determining, in response to a connection of the user equipment to a macro cell and before the user equipment being simultaneously connected to the small cell, a line of sight path between the user equipment and the small cell based on the positioning information of the user equipment and the small cell, and selecting an optimal antenna beam pair based on the determined line of sight path and the antenna beam directions wherein the optimal antenna beam pair is indicative of a substantially perfect alignment between antenna beams at the user equipment and the small cell; and wherein, the least one user equipment comprises a millimeter wave beamforming antenna, the macro cell and the small cell are arranged in a master/slave relationship where the macro cell is the master, the macro cell is configured to overlay the small cell and to provide control plane signaling and user data plane traffic to the user equipment, the small cell comprises a millimeter wave beamforming antenna and is configured to provide user data plane traffic to the user equipment.

11. The beam-searching method of clause 10 further comprising: determining optimal antenna beam at the level of the macro cell, and transmitting the optimal antenna beam pair to the user equipment and the small cell.

12. The beam-searching method of clause 10 further comprising determining optimal antenna beam at the level of the user equipment and the small cell.

13. The beam-searching method of clause 10 wherein the antenna beam directions comprise a pair of azimuth beam direction and elevation beam direction associated with each beam of the millimeter wave beamforming antenna where elevation direction is normal to the azimuth direction, and the method further comprising, selecting the optimal antenna beam pair based on a comparison criterion between the one or more pairs of azimuth beam direction and elevation beam direction and two pairs of azimuth direction and elevation direction associated with the end points of the determined line of sight path.

14. The beam-searching method of clause 13 wherein the comparison criterion comprises the closest pair of azimuth direction and elevation direction.

15. The beam-searching method of clause 13 wherein the comparison criterion comprises the pairs of azimuth direction and elevation direction comprised within a predetermined angle range around end points of the determined line of sight path.

16. The beam-searching method of clause 10 wherein the positioning information comprises geodetic coordinates comprising latitude information, longitude information and altitude information.

17. The beam-searching method of clause 16 further comprising obtaining the positioning information based on a GPS measurement.

18. The beam-searching method of clause 16 further comprising obtaining the positioning information based on a positioning reference signal of the macro cell.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. In addition, any above advantages are exemplary, and those or other advantages may be achieved by the proposed embodiments. Further, one of skill in the art may appreciate that not all advantages stated above are necessarily achieved by embodiments described herein.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected," or "operably coupled," to each other to achieve the desired functionality.

Furthermore, those skilled in the art will recognize that boundaries between the above described operations are merely illustrative. When multiple operations are discussed or illustrated, the multiple operations may be combined into a single operation, a single operation may be distributed in additional operations, and operations may be executed at least partially overlapping in time. Moreover, alternative embodiments may include multiple examples of a particular operation, and the order of operations may be altered in various other embodiments. Various other modifications, variations and alternatives are also possible. The specifications and drawings are, accordingly, to be regarded in an illustrative rather than in a restrictive sense.

In the claims, any reference signs placed between parentheses shall not be construed as limiting the claim. As used herein, the word 'comprising' does not exclude the presence of other elements or operations then those listed. Furthermore, the terms "a" or "an," as used herein, are defined as one or as more than one. Also, the use of introductory phrases such as "at least one" and "one or more" should not be construed to imply that the introduction of another element by the indefinite articles "a" or "an" limits any particular embodiment containing such introduced element to inventions containing only one such element. The same holds true for the use of definite articles. Unless stated otherwise, terms such as "first" and "second" are used to arbitrarily distinguish between the elements of an embodiment that such terms describe. Thus, these terms are not necessarily intended to indicate temporal or other prioritization of such elements.

The invention claimed is:

1. A beam determining unit intended to be connected to a wireless heterogeneous network, the beam determining unit comprising:
   a receiving unit configured to receive positioning information of a user equipment and a small cell information and antenna beam directions at the user equipment and the small cell, and
   a processing unit configured to, in response to a connection of the user equipment to a macro cell and before the user equipment being simultaneously connected to the small cell,
      determine a line of sight path between the user equipment and the small cell based on the positioning information of the user equipment and the small cell, and
      select an optimal antenna beam pair based on the determined line of sight path and the antenna beam directions wherein the optimal antenna beam pair is indicative of a substantially perfect alignment between antenna beams at the user equipment and the small cell; and
   wherein the wireless heterogeneous network comprises,
      at least one user equipment comprising a millimeter wave beamforming antenna,
      at least one macro cell operably coupled to at least one small cell, the macro cell and the small cell being arranged in a master/slave relationship where the macro cell is the master,
      the macro cell is configured to overlay the small cell and to provide control plane signaling and user data plane traffic to the user equipment,
      the small cell comprises a millimeter wave beamforming antenna and is configured to provide user data plane traffic to the user equipment.

2. The beam determining unit of claim 1 being comprised in a base station of the macro cell, the macro cell further comprising a transmitting unit configured to transmit the optimal antenna beam pair to the user equipment and the small cell.

3. The beam determining unit of claim 1 being comprised in the user equipment and in a base station of the small cell.

4. The beam determining unit of claim 1 wherein the antenna beam directions comprise a pair of azimuth beam direction and elevation beam direction associated with each beam of the millimeter wave beamforming antenna where elevation direction is normal to the azimuth direction, and
   the processing unit is further configured to select the optimal antenna beam pair based on a comparison criterion between the one or more pairs of azimuth beam direction and elevation beam direction and two pairs of azimuth direction and elevation direction associated with the end points of the determined line of sight path.

5. The beam determining unit of claim 4 wherein the comparison criterion comprises the closest pair of azimuth direction and elevation direction.

6. The beam determining unit of claim 4 wherein the comparison criterion comprises the pairs of azimuth direction and elevation direction comprised within a predetermined angle range around end points of the determined line of sight path.

7. The beam determining unit of claim 1 wherein the positioning information comprises geodetic coordinates comprising latitude information, longitude information and altitude information.

8. The beam determining unit of claim 7 wherein the positioning information is obtained based on a GPS measurement.

9. The beam determining unit of claim 7 wherein the positioning information is obtained based on a positioning reference signal of the macro cell.

10. A beam-searching method for a wireless heterogeneous network comprising at least one user equipment and at least one macro cell coupled to at least one small cell, the beam searching method comprising:
   receiving positioning information of a user equipment and a small cell information and antenna beam directions at the user equipment and the small cell, and, determining, in response to a connection of the user equipment to a macro cell and before the user equipment being simultaneously connected to the small cell, a line of sight path between the user equipment and the small cell based on the positioning information of the user equipment and the small cell, and
   selecting an optimal antenna beam pair based on the determined line of sight path and the antenna beam directions wherein the optimal antenna beam pair is indicative of a substantially perfect alignment between antenna beams at the user equipment and the small cell; and
   wherein,
      the least one user equipment comprises a millimeter wave beamforming antenna,
      the macro cell and the small cell are arranged in a master/slave relationship where the macro cell is the master,
      the macro cell is configured to overlay the small cell and to provide control plane signaling and user data plane traffic to the user equipment,
      the small cell comprises a millimeter wave beamforming antenna and is configured to provide user data plane traffic to the user equipment.

11. The beam-searching method of claim 10 further comprising:
   determining optimal antenna beam at the level of the macro cell, and
   transmitting the optimal antenna beam pair to the user equipment and the small cell.

12. The beam-searching method of claim 10 further comprising determining optimal antenna beam at the level of the user equipment and the small cell.

13. The beam-searching method of claim 10 wherein the antenna beam directions comprise a pair of azimuth beam direction and elevation beam direction associated with each beam of the millimeter wave beamforming antenna where elevation direction is normal to the azimuth direction, and the method further comprising, selecting the optimal antenna beam pair based on a comparison criterion between the one or more pairs of azimuth beam direction and elevation beam direction and two pairs of azimuth direction and elevation direction associated with the end points of the determined line of sight path.

14. The beam-searching method of claim 13 wherein the comparison criterion comprises the closest pair of azimuth direction and elevation direction.

15. The beam-searching method of claim 13 wherein the comparison criterion comprises the pairs of azimuth direction and elevation direction comprised within a predetermined angle range around end points of the determined line of sight path.

\* \* \* \* \*